United States Patent [19]

Lechleiter et al.

[11] Patent Number: 5,194,061
[45] Date of Patent: Mar. 16, 1993

[54] TOOL CHANGER

[75] Inventors: Karl Lechleiter, Oy-Mittelberg; Thomas Heinl, Kempten; Helmut Heel, Lengenwang, all of Fed. Rep. of Germany

[73] Assignee: Ott Maschinentechnik GmbH, Kempten, Fed. Rep. of Germany

[21] Appl. No.: 851,625

[22] Filed: Mar. 16, 1992

[30] Foreign Application Priority Data

Apr. 8, 1991 [DE] Fed. Rep. Germany ......... 4111307

[51] Int. Cl.[5] ........................... B23Q 3/157
[52] U.S. Cl. ........................... 483/41; 483/44
[58] Field of Search ............... 483/38, 39, 50, 40, 483/41, 42, 43, 44, 45, 46

[56] References Cited

U.S. PATENT DOCUMENTS

| | | | |
|---|---|---|---|
| 3,449,823 | 6/1969 | Jerve | 483/44 |
| 4,356,620 | 11/1982 | Babel et al. | 483/42 X |
| 4,363,166 | 12/1982 | Hiller | 483/40 |
| 4,637,120 | 1/1987 | Geiger | 483/46 |
| 4,700,452 | 10/1987 | Babel | 483/38 X |
| 4,780,951 | 11/1988 | Beyer et al. | 483/39 X |
| 4,845,835 | 7/1989 | Schneider | 483/50 X |

FOREIGN PATENT DOCUMENTS 3408734 9/1985 Fed. Rep. of Germany .

*Primary Examiner*—William Briggs
*Attorney, Agent, or Firm*—Flynn, Thiel, Boutell & Tanis

[57] ABSTRACT

A tool changer comprises a support (7) movable parallel to the axis (A or B) of a tool holder, a pivoting head (8) which pivots on the support (7) about an axis of rotation (D), and two gripper arms (9, 10) arranged on the head (8) substantially radially with respect to the axis of rotation, their free ends each carrying a gripper (11). The free ends of the gripper arms (9, 10) are so inclined relative to the axis of rotation (D) that the two tool axes (W1, W2) of the tools (5, 6) engaged by the grippers (11) and the axis of rotation (D) intersect in a single point (P), and so that the tool axes (W1, W2) of the tools (5, 6) engaged by the grippers (11) diverge from the axis of rotation (D) towards their holding ends (5a, 6a). Each of the tool axes (W1, W2) includes an acute angle ($\alpha$) of about 10° to 30° with the axis of rotation (D). The axis of rotation (D) is so arranged in the support (7) that it intersects the axis (A or B) of the tool holder (4) during the change and includes an angle ($\alpha$) with this axis which corresponds to the acute angle ($\alpha$).

4 Claims, 3 Drawing Sheets

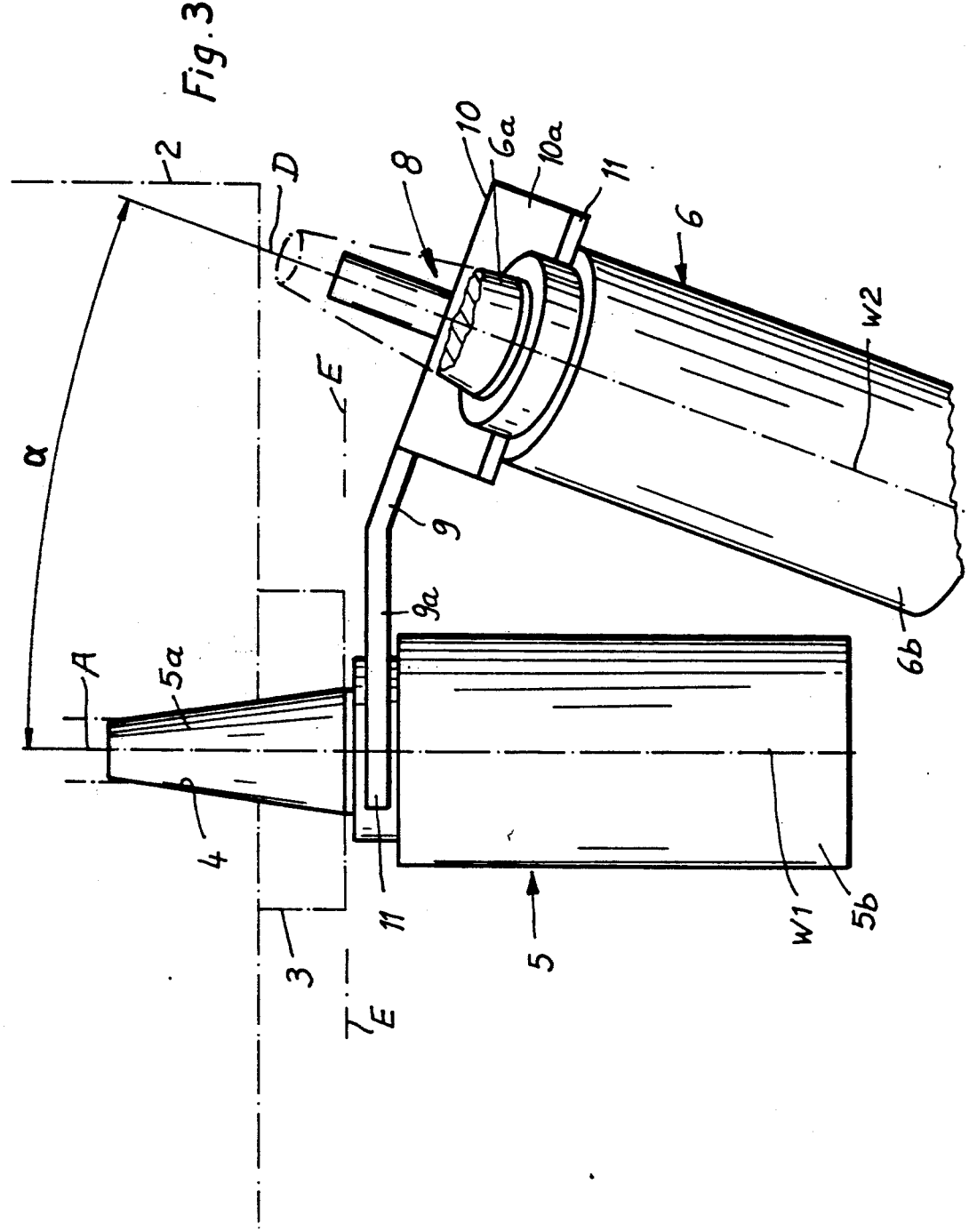

TOOL CHANGER

This invention relates to a tool change for changing tools in at least one tool holder of a machine tool, especially a machine tool spindle, with a support movable parallel to the axis of the tool holder, a changer head rotatably mounted in the support about an axis of rotation, with two gripper arms on the changer head arranged substantially radially with respect to the axis of rotation, their free ends each carrying a gripper and being so inclined relative to the axis of rotation that the tool axes of the tools engaged by the grippers diverge towards their holding ends relative to the axis of rotation, the axis of rotation in the support in the change operation being aligned at an acute angel to the axis (spindle axis) of the tool holder.

In a known tool changer of this kind (DE 3 408 734 C2) the axis of rotation runs at an angle of 45° to the axis of the machining spindle and the ends of the gripper arms provided with the grippers are inclined at 45° to the axis of rotation. By virtue of this arrangement the tool axes of the tools engaged by the grippers are perpendicular to one another and the holding ends of the tools stand out at an angle of 45° from the axis of rotation. As a result, when the changer head is rotated, there is a large swept-out circle in the region of the holding ends. Moreover, the working ends of the tools project beyond the axis of rotation so that, with longer tools, there is also a large swept-out circle in the region of the working ends. Accordingly a suitably large collision-free space has to be provided for the tool changing at the spindle nose and also in the region of the clamped workpiece, in order that the tool shall not collide with the workpiece or the machine when rotating the changer head. Moreover, in the known tool changer, the ends of the gripper arms are so aligned that the tool axes of the tools held by the grippers lie in parallel planes, spaced on the two sides of the axis of rotation of the changer head. This has the disadvantage that the whole tool is in each case arranged in a plane parallel to the axis of rotation and thus its centre of gravity are also at a spacing which corresponds at least to the spacing of this plane from the axis of rotation. Substantial moments arise from this when rotating the changer head, which are necessary to accelerate and brake the changer head. These high moments only allow a relatively slow rotation of the changer head, especially with heavy tools, so that the changing time is correspondingly extended.

In another known tool changer (DE 3 136 612 A1) three gripper arms are provided arranged like an orthogonal tripod turning about an axis of rotation. The gripper ends thereof are so aligned that the axes of each pair of adjacent tools lie in a plane, so that the tool axes of all three tools meet in a point. The axis of rotation of the changer head also runs through this point, so that this point lies on the spindle axis in the region of the spindle housing, behind the spindle nose. The tools are so arranged in the grippers that their holding ends converge towards the axis of rotation. This configuration has the disadvantage that the gripper arms have to be made relatively long and accordingly very stable, depending on the dimensions of the spindle housing, since the support for the axis of rotation can only be arranged alongside the spindle housing in this arrangement. The long and heavy changer arms have a high inertia and do not allow rapid changing, so that the changing time is correspondingly prolonged. Moreover, this known tool changer is not suited to such machine tools as have two machining spindles arranged at right angles to each other.

The invention is therefore based on the problem of providing a tool changer of the kind initially referred to which has a compact construction with the smallest possible swept circle, so that the collision space to be kept clear can be kept as small as possible and shortening of the changing time is made possible by a shorter time of rotation.

This is achieved according to the invention in that the free ends of the gripper arms are so inclined relative to the axis of rotation that the two tool axes of the tools engaged by the grippers and the axis of rotation intersect in a single point, each of the tool axes including an acute angle of about 10° to 30° with the axis of rotation, and in that the axis of rotation in the support is so arranged that the point lies during changing in front of the tool holder (spindle nose) on the axis of the tool holder and the axis of rotation includes a angle with this axis which corresponds to the acute angle which the tool axes include with the axis of rotation.

In this form of the tool changer the tool axes of the tools engaged by the grippers are only inclined at a relatively small angle of up to 30° to the axis of rotation. As a result a smaller swept circle of the holding ends of the tools results. Moreover the working ends of the tools are inclined towards the axis of rotation and have only a small spacing from one another and from the axis of rotation. This has the advantage that the working ends also of the tools describe a small swept circle during rotation of the changer head. As a result, the collision-free space in front of the tool holder (in front of the spindle nose) and also in the region of the clamped workpiece can be kept small. The inclination of the tool axes within the specified angular range has the further advantage that, on changing the working tool, the second tool is not in the collision region with the working spindle of the spindle box or other machine components of conventional boring and milling machines. Since the tool axes incline in towards the working ends of the tools, the centres of gravity of the tools lie closer to the axis of rotation. Accordingly smaller inertial forces arise when rotating the changer head, so that the changer head can be rotated at a higher speed. In this way the change time is shortened. Moreover the tool changer can be fitted with relatively short gripper arms, so that not only the structural size but also the weight and the distance of the centres of gravity from the axis of rotation are reduced. This likewise contributes to a reduction in inertial forces and a shortening of the change time. In addition, the tool changer according to the invention, like the initially described known tool changer, has the advantage that it is also suited to serving alternately two machining spindles which are disposed at right angles to one another.

A particularly advantageous embodiment of the invention consists in that the gripper arms are arranged offset from one another in relation to the axis of rotation by 90° at the most. This has the advantage that the changer head only has to carry out a quarter of a turn at the most in the change operation. This likewise contributes to shortening the change time.

Further advantageous embodiments of the invention are characterized in the other claims. The invention will be described in more detail, by way of example, with reference to the accompanying drawings in which:

FIG. 3 is a side view of the changer head with the spindle housing shown in broken lines.

Figure 1:
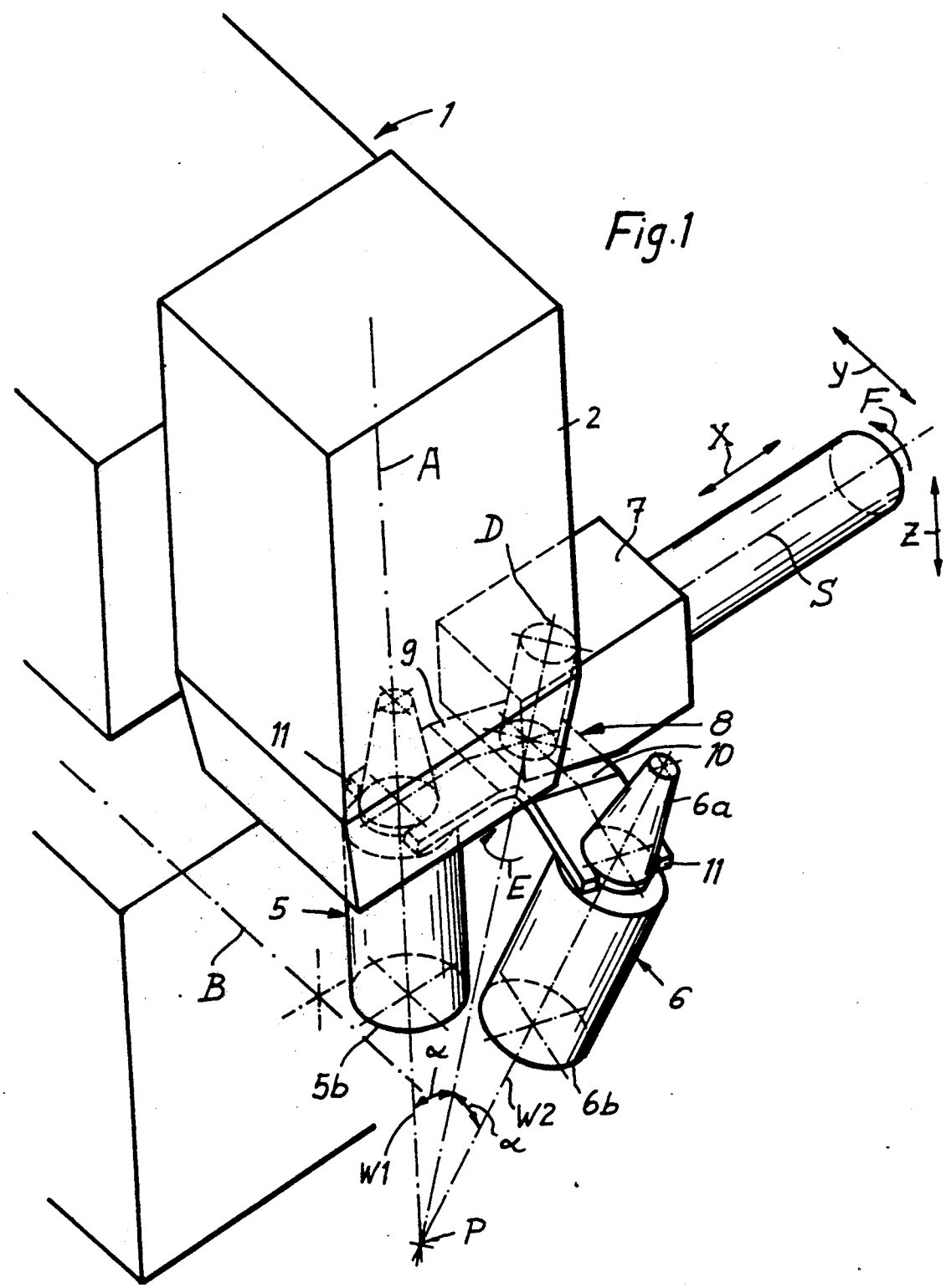
FIG. 1 is a schematic representation of the tool changer and a machine tool.

In the drawings a conventional universal boring and milling machine is designated 1, having a vertical machining spindle 3 in a vertically displaceable spindle housing 2. Only the axis A of this machining spindle is shown in FIG. 1. The universal boring and milling machine can furthermore have a horizontal machining spindle, of which however only its axis is shown and designated B. The vertical and horizontal machining spindles each have a tool holder, which can be formed as a short taper holder 4, as is shown in FIG. 3. Different tools 5, 6 are to be fitted in this tool holder sequentially in accordance with machining requirements.

The tool changer according to the invention is provided to this end. This has a support 7 which can rotate in a mounting arm (not shown) about the axis of rotation S in the illustrated embodiment. The axis of rotation S is arranged perpendicular to a plane containing the axes A and B of the two machining spindles which are perpendicular to one another. The support 7 is movable by means of the mounting arm in the direction Z parallel to the spindle axis A and in the direction Y parallel to the spindle axis B. Further possibilities of movement of the support can be provided, in order to transfer the tools to a magazine (not shown) or remove them therefrom.

Figure 2:
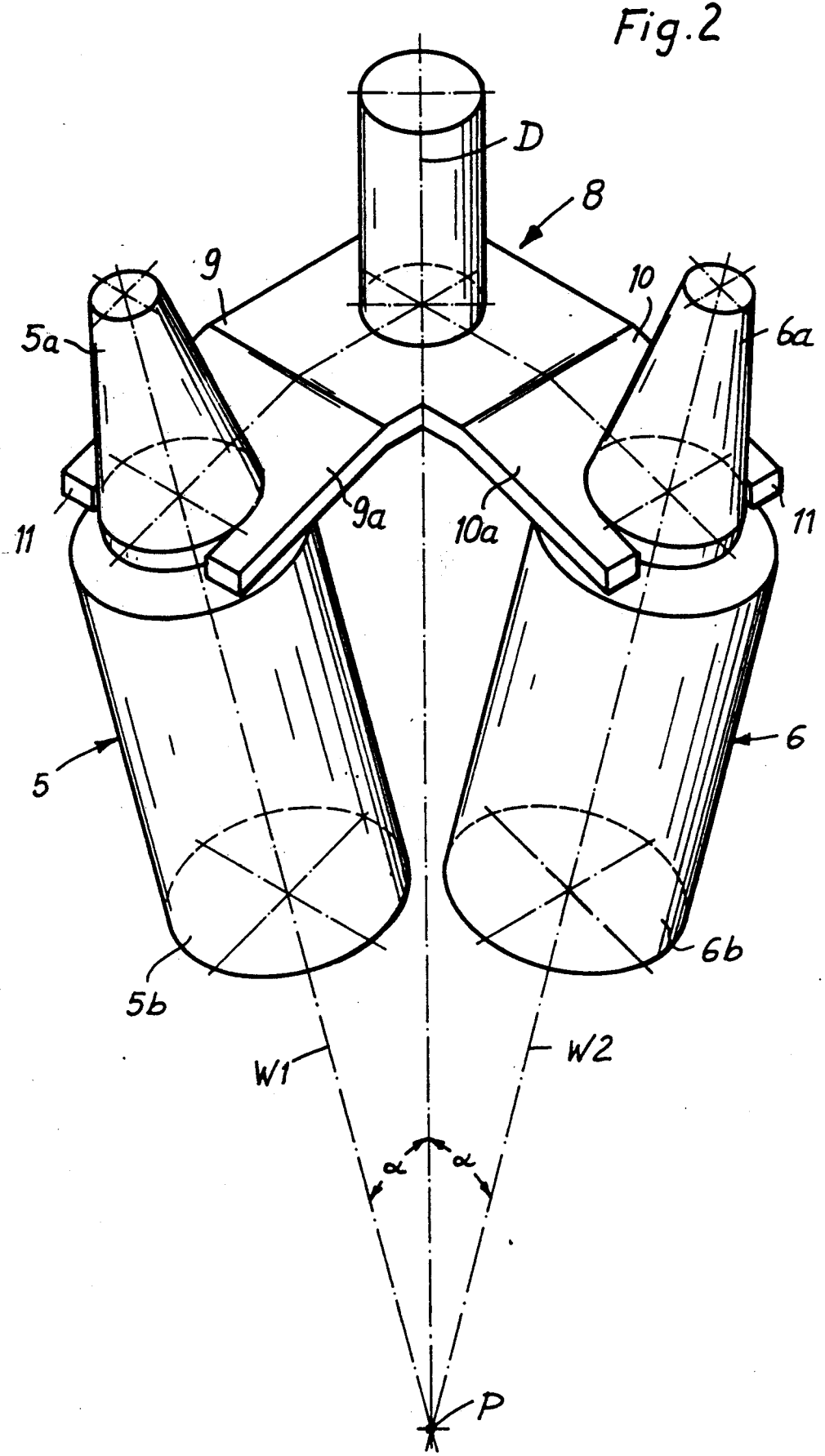
FIG. 2 is a schematic representation of a changer head.

A changer head 8 is mounted rotatably about an axis of rotation D in the support 7. The changer head 8 has two gripper arms 9, 10 offset relative to one another about the axis of rotation D by 90°. The offset of the two gripper arms 9, 10 by 90° or less has the advantage that the gripper head only has to be rotated by 90° or less each time in the changing operation, whereby shorter changing times result. If this advantage is dropped, the gripper arms could be diametrically opposite if desired. As can further be seen from FIG. 2, the free ends 9a and 10a of the two gripper arms are inclined and carry known grippers 11, which are however only schematically represented. The free ends 9a, 10a of the gripper arms 9, 10 are so inclined relative to the axis of rotation D that the two tool axes W1 and W2 of the tools engaged by the grippers 11 and the axis of rotation D intersect in a single point P. Each of the tool axes W1 and W2 includes an acute angle $\alpha$ with the axis of rotation of about 10°-30°. This angle preferably amounts to about 20°. The free ends 9a and 10a of the gripper arms 9, 10 are further so inclined relative to the axis of rotation D that the tool axes W1 and W2 of the tools 5, 6 engaged by the grippers 11 diverge towards their holding ends 5a, 6a. The holding ends 5a, 6a of the tools 5, 6 are matched to the tool holder of the machine tool. They can be for example a short taper or any normal form of a holding end of a tool. The working ends 5b and 6b of the tools 5, 6 carrying the cutters converge progressively on one another, the further away they are from the grippers 11.

The axis of rotation D is so arranged in the support 7 that, in the actual changing in or out of the respective tool in the holder of the respective spindle, it intersects the axis A or B thereof, as is shown in FIG. 1. The point P then likewise lies on the axis A or B. The axis of rotation D includes with the respective axis A or B of that holder in which a tool is to be changed in or out an angle $\alpha$ which corresponds to the acute angle $\alpha$ which the tool axes W1 and W2 include with the axis of rotation D.

The change operation proceeds in the following manner:

The gripper head 8 has taken the tool out of the magazine (not shown) in the gripper 11 arranged on the gripper arm 10. The support 7 is moved in the direction X of its rotational axis S until the gripper 11 arranged on the gripper arm 9 is in the region of the vertical machining spindle contained in the spindle housing 2. The gripper 11 engages the tool 5 held in the vertical machining spindle. Then the support 7 performs a vertical movement in the direction Z, i.e. in the precise direction of the spindle axis A. Through this it removes the tool 5 from the machining spindle. When the holding end 5a has completely cleared the vertical machining spindle 3 the downwards movement of the support 7 is stopped. The changer head 8 is now rotated through 90° about its axis of rotation D in the direction E, whereby the tool axis W2 of the tool 6 now registers with the spindle axis A and the holding end 6a is in front of the spindle nose. Through upwards movement of the support 7 in the direction Z the holding end 6a is pushed into the tool holder in the vertical spindle and clamped. After opening the gripper 11 arranged on the gripper arm 10, the actual change operation is complete. The support 7 moves away from the spindle axis A in the direction X, brings the removed tool into the magazine and takes out a new tool.

If a tool is to be exchanged in the horizontal machining spindle with the spindle axis B, it is only necessary to rotate the support 7 through 90° in the direction F about the axis of rotation S and to move it down far enough in the direction Z for the axis of rotation D to intersect the spindle axis B. In this position one of the tool axes W1 and W2 registers with the spindle axis B. The positions of the tool axes W1 and W2 relative to the axis of rotation D are determined by the inclination of the ends 9a, 10a of the gripper arms.

As can be seen from FIG. 3, the holding end 6a of the tool to be changed in lies beneath the holding end 5a of the tool 5 in the machining spindle 3. Collisions between the holding end 6a and the spindle housing 2 during the changing operation are avoided in this way.

We claim:

1. Tool changer for changing tools in at least one tool holder of a machine tool, especially a machine tool spindle, with a support movable parallel to the axis of the tool holder, a changer head rotatably mounted in the support about an axis of rotation, with two gripper arms on the changer head arranged substantially radially with respect to the axis of rotation, their free ends each carrying a gripper and being so inclined relative to the axis of rotation that the tool axes of the tools engaged by the grippers diverge towards their holding ends relative to the axis of rotation, the axis of rotation in the support in the change operation being aligned at an acute angle to the axis (spindle axis) of the tool holder, characterized in that the free ends (9a, 10a) of the gripper arms (9, 10) are so inclined relative to the axis of rotation (D) that the two tool axes (W1, W2) of the tools (5, 6) engaged by the grippers (11) and the axis of rotation (D) intersect in a single point (P) each of the tool axes (W1, W2) including an acute angle ($\alpha$) of substantially 10° to 30° with the axis of rotation (D), and in that the axis of rotation (D) in the support (7) is so arranged that the point (P) lies during changing in front of the tool holder (spindle nose) on the axis (A or B) of the tool holder (4) and the axis of rotation (D) includes a angle (α) with this axis which corresponds to the acute angle (α) which the tool axes (W1, W2) include with the axis of rotation (D).

2. Tool changer according to claim 1, characterized in that the gripper arms (9, 10) are arranged offset from one another in relation to the axis of rotation (D) by 90° at the most.

3. Tool changer according to claim 1 characterized in that the acute angle (α) amounts to substantially 20°.

4. Tool changer according to claim 1, characterized in that the support (7) is rotatable about an axis of rotation (S) which is arranged perpendicular to a plane running through the axes (A, B) of two mutually perpendicular machining spindles of a machine tool.

* * * * *